United States Patent
Wang et al.

(10) Patent No.: US 9,918,299 B2
(45) Date of Patent: Mar. 13, 2018

(54) WIRELESS COMMUNICATION METHOD FOR DEVICE TO DEVICE COMMUNICATION AND USER EQUIPMENT

(71) Applicant: Sun Patent Trust, New York, NY (US)

(72) Inventors: Lilei Wang, Beijing (CN); Hidetoshi Suzuki, Kanagawa (JP); Yoshihiko Ogawa, Kanagawa (JP); Masayuki Hoshino, Kanagawa (JP)

(73) Assignee: Sun Patent Trust, New York, NY (US)

( * ) Notice: Subject to any disclaimer, the term of this patent is extended or adjusted under 35 U.S.C. 154(b) by 0 days.

(21) Appl. No.: 14/907,797

(22) PCT Filed: Aug. 6, 2013

(86) PCT No.: PCT/CN2013/080917
§ 371 (c)(1),
(2) Date: Jan. 26, 2016

(87) PCT Pub. No.: WO2015/017983
PCT Pub. Date: Feb. 12, 2015

(65) Prior Publication Data
US 2016/0174194 A1    Jun. 16, 2016

(51) Int. Cl.
*H04W 72/00* (2009.01)
*H04B 1/713* (2011.01)
(Continued)

(52) U.S. Cl.
CPC .......... *H04W 72/005* (2013.01); *H04B 1/713* (2013.01); *H04L 5/00* (2013.01);
(Continued)

(58) Field of Classification Search
CPC ................ H04B 1/713; H04W 72/005; H04W 72/0446; H04W 76/023; H04W 72/0406; H04L 5/00
See application file for complete search history.

(56) References Cited

U.S. PATENT DOCUMENTS 8,948,770 B2    2/2015  Du et al.
2011/0151887 A1 6/2011  Hakola et al.
(Continued)

FOREIGN PATENT DOCUMENTS

CN    102647246 A    8/2012
CN    102905334 A    1/2013
(Continued)

OTHER PUBLICATIONS

International Search Report dated May 14, 2014, for corresponding International Application No. PCT/CN2013/080917, 2 pages.
(Continued)

*Primary Examiner* — Charles C Jiang
*Assistant Examiner* — Oussama Roudani
(74) *Attorney, Agent, or Firm* — Seed IP Law Group LLP

(57) ABSTRACT

Provided are wireless communication methods for D2D communication and UEs therefor. A wireless communication method involves transmitting either a first DCI or a second DCI based on whether a first UE and a second UE are to be in a communication type of groupcast or unicast. In the wireless communication methods, the first DCI and the second DCI are scrambled by the UE ID of the second UE if the first UE and the second UE are in the communication type of unicast upon transmitting the first DCI and the second DCI, and the first DCI and the second DCI are scrambled by the group ID if the first UE and the second UE are in the communication type of groupcast upon transmitting the first DCI and the second DCI.

10 Claims, 9 Drawing Sheets

500

Transmitting a first DCI from a first UE to a second UE when the first UE and the second UE are to be in a communication type of groupcast — 501

Transmitting a second DCI from the first UE to the second UE when the first UE and the second UE are to be in a communication type of unicast — 502

(51) Int. Cl.
*H04W 72/04* (2009.01)
*H04W 76/02* (2009.01)
*H04L 5/00* (2006.01)

(52) U.S. Cl.
CPC ... *H04W 72/0406* (2013.01); *H04W 72/0446* (2013.01); *H04W 76/023* (2013.01)

(56) References Cited

U.S. PATENT DOCUMENTS

| | | |
|---|---|---|
| 2011/0306349 A1 | 12/2011 | Hakola et al. |
| 2012/0093098 A1* | 4/2012 | Charbit ............... H04W 72/04 370/329 |
| 2013/0028177 A1 | 1/2013 | Koskela et al. |
| 2013/0148566 A1 | 6/2013 | Doppler et al. |
| 2013/0195041 A1* | 8/2013 | Papasakellariou .. H04W 72/042 370/329 |
| 2014/0018010 A1 | 1/2014 | Gao et al. |
| 2014/0177602 A1* | 6/2014 | Chen ..................... H04W 52/04 370/336 |
| 2014/0179330 A1 | 6/2014 | Du et al. |
| 2014/0226552 A1* | 8/2014 | Niu ......................... H04W 4/06 370/312 |

FOREIGN PATENT DOCUMENTS

| | | |
|---|---|---|
| KR | 2013-0005228 A | 1/2013 |
| WO | 2012/129806 A1 | 10/2012 |

OTHER PUBLICATIONS

Renesas Mobile Europe Ltd, "ProSe direct communication (D2D)," R1-132174, 3GPP TSG-RAN WG1 Meeting #73, Agenda Item: 6.2.7.4, Fukuoka, May 20-24, 2013, 6 pages.

Qualcomm Incorporated, "Direct communication one-to-many, "S2-132826, SA WG2 Meeting #98, Agenda Item: 6.4, Valencia, Spain, Jul. 15-19, 2013, 8 pages.

\* cited by examiner

Transmitting either a first DCI for a first resource allocation type or a second DCI for a second resource allocation type from a first UE to a second UE

WIRELESS COMMUNICATION METHOD FOR DEVICE TO DEVICE COMMUNICATION AND USER EQUIPMENT

TECHNICAL FIELD

The present disclosure relates to the field of wireless communication, and in particular, to a wireless communication method for device to device (D2D) communication and user equipment (UE) therefor.

BACKGROUND

Device-to-device (D2D) communication is a new topic in 3GPP ($3^{rd}$ Generation Partnership Project) LTE (Long Term Evolution) Release 12 and the main target for such a topic is to study how to realize direct D2D communication. D2D communication could happen with wireless network coverage (e.g. for commercial case) or without network coverage (e.g. for public safety). FIG. 1 illustrates exemplary D2D communications with and without wireless network coverage. On the left side of FIG. 1, UE 101 and UE 102 are within the wireless network coverage of eNB (eNode B) 103, but they are communicating with each other directly (i.e. not through eNB 103). On the right side of FIG. 1, UE 104 and UE 105 are not within any wireless network coverage, and they are communicating with each other directly.

Currently, D2D communication is not clear and needs to be studied in many aspects. In particular, at least two aspects need to be further studied. The first aspect is how to realize transition between groupcast communication and unicast communication. The second problem is how to do resource scheduling in D2D, especially in groupcast communication.

SUMMARY OF THE DISCLOSURE

The present disclosure is made in view of the above in order to realize transition between groupcast communication and unicast communication in D2D communication.

In a first aspect of the present disclosure, there is provided a wireless communication method, comprising steps of: transmitting a first downlink control information (DCI) from a first user equipment (UE) to a second UE when the first UE and the second UE are to be in a communication type of groupcast, wherein the first DCI is able to indicate the communication type of groupcast and a group ID of a UE group for the groupcast, and a first potential physical downlink shared channel (PDSCH) following the first DCI is scrambled by the group ID; and transmitting a second DCI from the first UE to the second UE when the first UE and the second UE are to be in a communication type of unicast, wherein the second DCI is able to indicate the communication type of unicast, and a second potential PDSCH following the second DCI is scrambled by a UE ID of the second UE; wherein the first DCI and the second DCI are scrambled by the UE ID of the second UE respectively if the first UE and the second UE are in the communication type of unicast upon transmitting the first DCI and the second DCI, and the first DCI and the second DCI are scrambled by the group ID respectively if the first UE and the second UE are in the communication type of groupcast upon transmitting the first DCI and the second DCI.

In a second aspect of the present disclosure, there is provided a wireless communication method, comprising steps of: transmitting a first downlink control information (DCI) from a first user equipment (UE) to a second UE; and transmitting a second DCI from the first UE to the second UE, wherein whether a specific field in the first DCI and the second DCI is the same indicates whether the first UE and the second UE are to be in a communication type of unicast or groupcast, when the first UE and the second UE are to be in the communication type of groupcast, at least one of the first DCI and the second DCI indicates a group ID of a UE group for the groupcast, and the first DCI and the second DCI are scrambled by a UE ID of the second UE if the first UE and the second UE are in the communication type of unicast upon transmitting the first DCI and the second DCI, and the first DCI and the second DCI are scrambled by the group ID if the first UE and the second UE are in the communication type of groupcast upon transmitting the first DCI and the second DCI.

In a third aspect of the present disclosure, there is provided a user equipment (UE) for wireless communication, comprising a transmitting unit configured to transmit a first downlink control information (DCI) to a second UE when the UE and the second UE are to be in a communication type of groupcast, wherein the first DCI is able to indicate the communication type of groupcast and a group ID of a UE group for the groupcast, and a first potential physical downlink shared channel (PDSCH) following the first DCI is scrambled by the group ID; and configured to transmit a second DCI to the second UE when the UE and the second UE are to be in a communication type of unicast, wherein the second DCI is able to indicate the communication type of unicast, and a second potential PDSCH following the second DCI is scrambled by a UE ID of the second UE, wherein the first DCI and the second DCI are scrambled by the UE ID of the second UE respectively if the UE and the second UE are in the communication type of unicast upon transmitting the first DCI and the second DCI, and the first DCI and the second DCI are scrambled by the group ID respectively if the UE and the second UE are in the communication type of groupcast upon transmitting the first DCI and the second DCI.

In a fourth aspect of the present disclosure, there is provided a user equipment (UE) for wireless communication, comprising a transmitting unit configured to transmit a first downlink control information (DCI) and a second DCI to the second UE, wherein whether a specific field in the first DCI and the second DCI is the same indicates whether the UE and the second UE are to be in a communication type of unicast or groupcast, when the UE and the second UE are to be in the communication type of groupcast, at least one of the first DCI and the second DCI indicates a group ID of a UE group for the groupcast, and the first DCI and the second DCI are scrambled by a UE ID of the second UE if the UE and the second UE are in the communication type of unicast upon transmitting the first DCI and the second DCI, and the first DCI and the second DCI are scrambled by the group ID if the UE and the second UE are in the communication type of groupcast upon transmitting the first DCI and the second DCI.

In a fifth aspect of the present disclosure, there is provided a wireless communication method, comprising steps of: receiving, by a first user equipment (UE), a first downlink control information (DCI) transmitted from a second UE when the first UE and the second UE are to be in a communication type of groupcast, wherein the first DCI is able to indicate the communication type of groupcast and a group ID of a UE group for the groupcast, and a first potential physical downlink shared channel (PDSCH) following the first DCI is scrambled by the group ID; and receiving, by the first UE, a second DCI transmitted from the second UE when the first UE and the second UE are to be in a communication type of unicast, wherein the second DCI is able to indicate the communication type of unicast, and a second potential PDSCH following the second DCI is scrambled by a UE ID of the first UE, wherein the first DCI and the second DCI are scrambled by the UE ID of the first UE respectively if the first UE and the second UE are in the communication type of unicast upon transmitting the first DCI and the second DCI, and the first DCI and the second DCI are scrambled by the group ID respectively if the first UE and the second UE are in the communication type of groupcast upon transmitting the first DCI and the second DCI.

In a sixth aspect of the present disclosure, there is provided a wireless communication method, comprising steps of: receiving, by a first user equipment (UE), a first downlink control information (DCI) transmitted from a second UE; and receiving, by the first UE, a second DCI transmitted from the second UE, wherein whether a specific field in the first DCI and the second DCI is the same indicates whether the first UE and the second UE are to be in a communication type of unicast or groupcast, when the first UE and the second UE are to be in the communication type of groupcast, at least one of the first DCI and the second DCI indicates a group ID of a UE group for the groupcast, and the first DCI and the second DCI are scrambled by a UE ID of the first UE if the first UE and the second UE are in the communication type of unicast upon transmitting the first DCI and the second DCI, and the first DCI and the second DCI are scrambled by the group ID if the first UE and the second UE are in the communication type of groupcast upon transmitting the first DCI and the second DCI.

In a seventh aspect of the present disclosure, there is provided a user equipment (UE) for wireless communication, comprising a receiving unit configured to receive a first downlink control information (DCI) transmitted from a second UE when the UE and the second UE are to be in a communication type of groupcast, wherein the first DCI is able to indicate the communication type of groupcast and a group ID of a UE group for the groupcast, and a first potential physical downlink shared channel (PDSCH) following the first DCI is scrambled by the group ID; and configured to receive a second DCI transmitted from the second UE when the UE and the second UE are to be in a communication type of unicast, wherein the second DCI is able to indicate the communication type of unicast, and a second potential PDSCH following the second DCI is scrambled by a UE ID of the UE, wherein the first DCI and the second DCI are scrambled by the UE ID of the UE respectively if the UE and the second UE are in the communication type of unicast upon transmitting the first DCI and the second DCI, and the first DCI and the second DCI are scrambled by the group ID respectively if the UE and the second UE are in the communication type of groupcast upon transmitting the first DCI and the second DCI.

In a eighth aspect of the present disclosure, there is provided a user equipment (UE) for wireless communication, comprising: a receiving unit configured to receive a first downlink control information (DCI) and a second DCI transmitted from a second UE, wherein whether a specific field in the first DCI and the second DCI is the same indicates whether the UE and the second UE are to be in a communication type of unicast or groupcast, when the UE and the second UE are to be in the communication type of groupcast, at least one of the first DCI and the second DCI indicates a group ID of a UE group for the groupcast, and the first DCI and the second DCI are scrambled by a UE ID of the UE if the UE and the second UE are in the communication type of unicast upon transmitting the first DCI and the second DCI, and the first DCI and the second DCI are scrambled by the group ID if the UE and the second UE are in the communication type of groupcast upon transmitting the first DCI and the second DCI.

In addition, the present disclosure is also made in order to realize resource scheduling in D2D communication.

In a ninth aspect of the present disclosure, there is provided a wireless communication method for resource allocation, comprising a step of transmitting a downlink control information (DCI) for the resource allocation from a first user equipment (UE) to a second UE, wherein the DCI is able to indicate a resource allocation pattern and a transmission life.

In the ninth aspect, preferably the resource allocation pattern and/or the transmission life can be implicitly indicated by the physical resource block (PRB) index and/or number of the DCI, and/or the control channel element (CCE) index and/or number of the DCI.

In the ninth aspect, preferably the resource allocation pattern and/or the transmission life can be implicitly indicated by the physical resource block (PRB) index and/or number of the physical downlink shared channel (PDSCH) allocated to the second UE.

In the ninth aspect, preferably the resource allocation pattern and/or the transmission life can be implicitly indicated by the physical resource block (PRB) index and/or number difference between the physical downlink shared channel (PDSCH) allocated to the second UE and the DCI.

In the ninth aspect, preferably the DCI can use a DCI format defined in 3GPP Release 8-11 except that some bits in the DCI format defined in 3GPP Release 8-11 are used to indicate the resource allocation pattern and/or the transmission life in the DCI.

In the ninth aspect, preferably, the resource allocation pattern can include frequency hopping pattern, transmission times (or transmission interval), and/or transmission duration.

In the ninth aspect, preferably, the resource allocation pattern can be indicated in such a way that the information for indicating the resource allocation pattern in the DCI indicates a resource allocation pattern index by which the resource allocation pattern can be selected from a resource allocation pattern set configured by the radio resource control (RRC) layer.

In the ninth aspect, preferably the type of the resource allocation can be indicated by several fields in the DCI jointly.

In a tenth aspect of the present disclosure, there is provided a wireless communication method for resource allocation, comprising a steps of transmitting either a first downlink control information (DCI) for a first resource allocation type or a second DCI for a second resource allocation type from a first user equipment (UE) to a second UE, wherein the first DCI is scrambled by a first radio network temporary identifier (RNTI) and the second DCI is scrambled by a second RNTI which is different from the first RNTI.

In an eleventh aspect of the present disclosure, there is provided a user equipment UE for wireless communication, comprising a transmitting unit configured to transmit a downlink control information (DCI) for resource allocation from the UE to a second UE, wherein the DCI is able to indicate a resource allocation pattern and a transmission life.

In a twelfth aspect of the present disclosure, there is provided a user equipment (UE) for wireless communication, comprising a transmitting unit configured to transmit either a first downlink control information (DCI) for a first resource allocation type or a second DCI for a second resource allocation type to a second UE, wherein the first DCI is scrambled by a first radio network temporary identifier (RNTI) and the second DCI is scrambled by a second RNTI which is different from the first RNTI.

In a thirteenth aspect of the present disclosure, there is provided a wireless communication method for resource allocation, comprising a step of receiving, by a first user equipment (UE), a downlink control information (DCI) for the resource allocation transmitted from a second UE, wherein the DCI is able to indicate a resource allocation pattern and a transmission life.

In a fourteenth aspect of the present disclosure, there is provided a wireless communication method for resource allocation, comprising a step of receiving, by a first user equipment (UE), either a first downlink control information (DCI) for a first resource allocation type or a second DCI for a second resource allocation type transmitted from a second UE, wherein the first DCI is scrambled by a first radio network temporary identifier (RNTI) and the second DCI is scrambled by a second RNTI which is different from the first RNTI.

In a fifteenth aspect of the present disclosure, there is provided a user equipment (UE) for wireless communication, comprising a receiving unit configured to receive a downlink control information (DCI) for the resource allocation transmitted from a second UE, wherein the DCI is able to indicate a resource allocation pattern and a transmission life.

In a sixteenth aspect of the present disclosure, there is provided a user equipment (UE) for wireless communication, comprising a receiving unit configured to receive either a first downlink control information (DCI) for a first resource allocation type or a second DCI for a second resource allocation type transmitted from a second UE, wherein the first DCI is scrambled by a first radio network temporary identifier (RNTI) and the second DCI is scrambled by a second RNTI which is different from the first RNTI.

It is noted that the preferable solutions for the ninth aspect also apply for the tenth to sixteenth aspect.

The foregoing is a summary and thus contains, by necessity, simplifications, generalization, and omissions of details. Other aspects, features, and advantages of the devices and/or processes and/or other subject matters described herein will become apparent in the teachings set forth herein. The summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

BRIEF DESCRIPTION OF THE DRAWINGS

The foregoing and other features of the present disclosure will become more fully apparent from the following description and appended claims, taken in conjunction with the accompanying drawings. Understanding that these drawings depict only several embodiments in accordance with the disclosure and are, therefore, not to be considered limiting of its scope, the disclosure will be described with additional specificity and detail through use of the accompanying drawings, in which:

DETAILED DESCRIPTION

Figure 1:
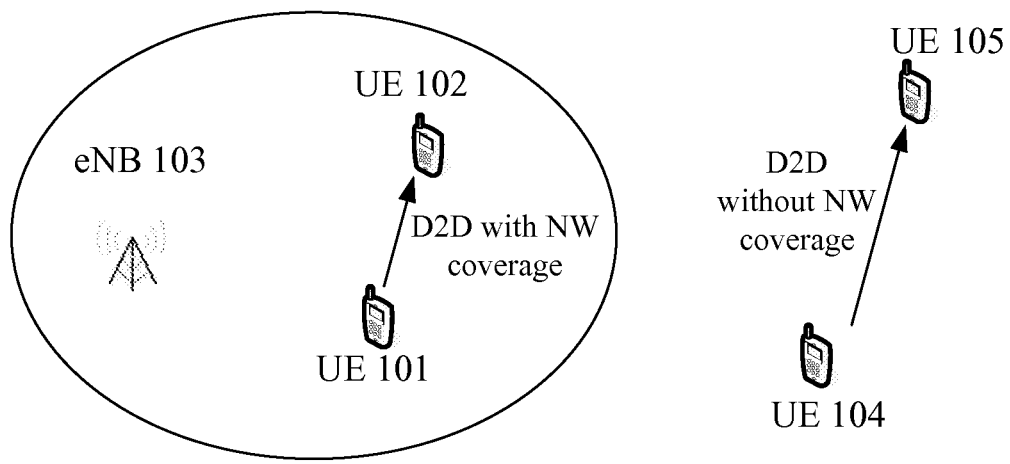
FIG. 1 illustrates exemplary D2D communications with and without wireless network coverage.

In the following detailed description, reference is made to the accompanying drawings, which form a part thereof. In the drawings, similar symbols typically identify similar components, unless context dictates otherwise. It will be readily understood that the aspects of the present disclosure can be arranged, substituted, combined, and designed in a wide variety of different configurations, all of which are explicitly contemplated and make part of this disclosure.

(First Embodiment)

Figure 2:
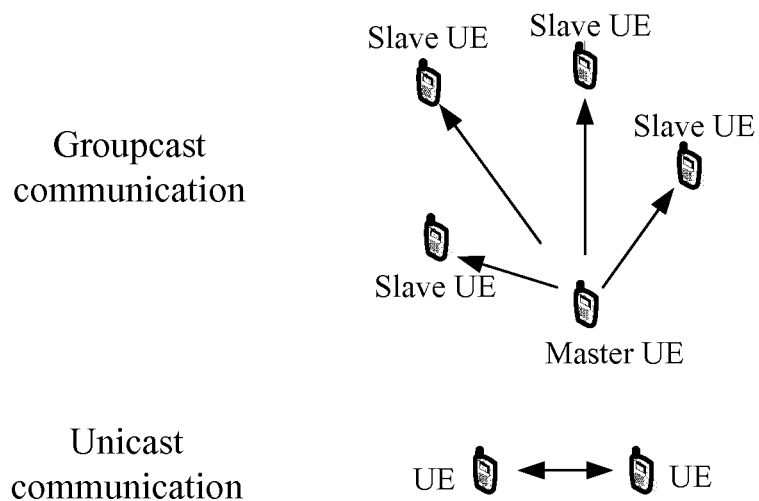
FIG. 2 illustrates an example of groupcast communication and unicast communication in D2D communication.

In D2D communication, unicast communication means one UE communicates with another UE, and groupcast communication means one UE communicates with multiple other UEs. The later is like eNB broadcasts system information in normal wireless communication with eNB. It is noted that groupcast herein can also include broadcast and multicast, and groupcast only means that one UE broadcasts information using a groupcast protocol to multiple potential other UEs rather than means there must actually be multiple other UEs which are receiving the information. FIG. 2 illustrates an example of groupcast communication and unicast communication in D2D communication. In groupcast communication, one UE is configured as the master UE which functions as an eNB in normal wireless network, and multiple other UEs works as slave UEs which are able to communicate with master UE simultaneously. On the other hand, in unicast communication, two UEs communicate with each other peer to peer.

Figure 3:
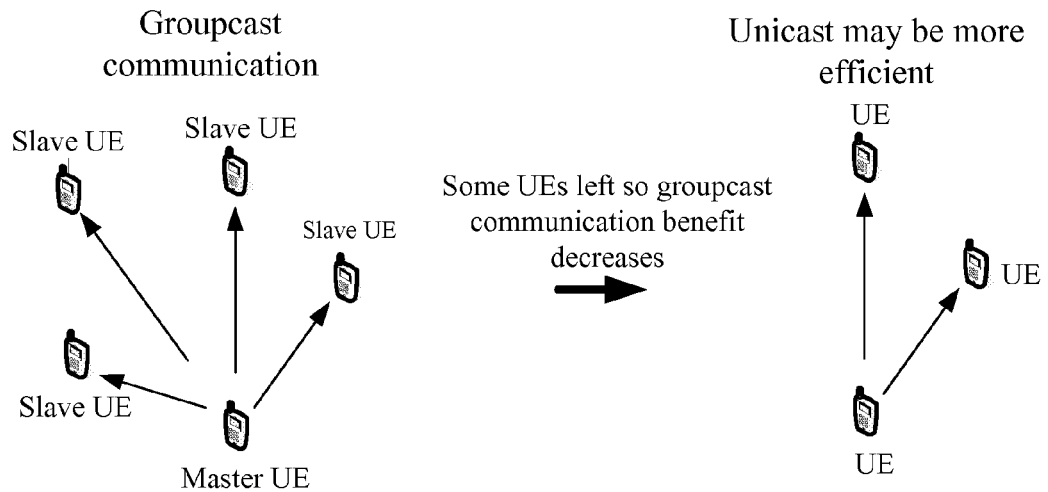
FIG. 3 illustrates a scenario in which groupcast communication may need to be transited to unicast.
Figure 4:
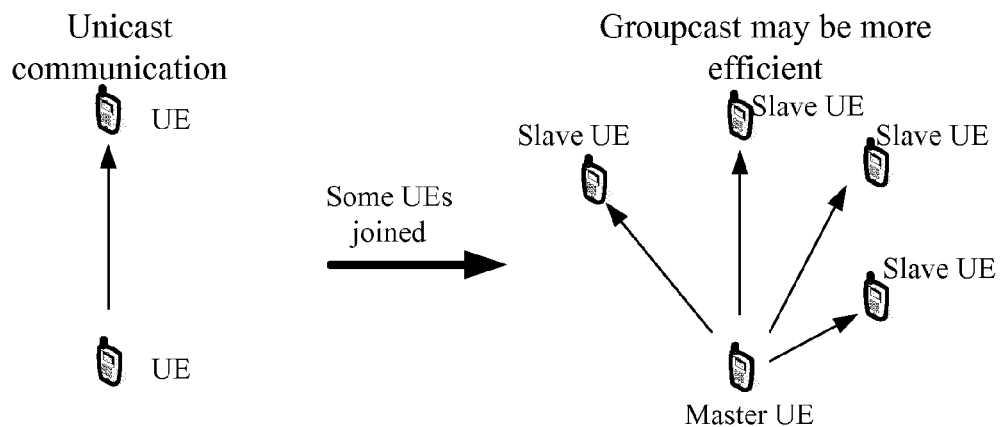
FIG. 4 illustrates a scenario in which unicast communication may need to be transited to groupcast.

In order to make D2D communication more efficient, the two communication types (unicast and groupcast) may need to be changed over frequently in D2D communication. FIG. 3 illustrates a scenario in which groupcast communication may need to be transited to unicast. On the left side of FIG. 3, the master UE broadcasts (groupcasts) traffics to four slave UEs. In this case, the communication type of groupcast may be preferred, since there are many slave UEs in the same group so the efficiency of groupcast communication is high. However, when some UEs leave the groupcast group, and only few slave UEs are left in the group, the benefit of groupcast becomes small. Unicast may be more suitable at this point. On the right side of FIG. 3, only two slave UEs are left in the group, and the communication type may prefer to be changed to unicast. FIG. 4 illustrates a scenario in which unicast communication may need to be transited to groupcast. On the left side of FIG. 4, a unicast communication is illustrated since only two UEs are communicating. However, with the joining of new UEs, groupcast may become more suitable, as shown on the right side of FIG. 4. It is noted that, in real D2D scenario, the situation could be more complicated and each UE may perform unicast with one UE and act as a master UE to another group. The transition between unicast and groupcast can also be frequent as the services and members may changes frequently. Therefore, how to realize fast and flexible transition between groupcast and unicast becomes an important issue to D2D communication.

Figure 5:
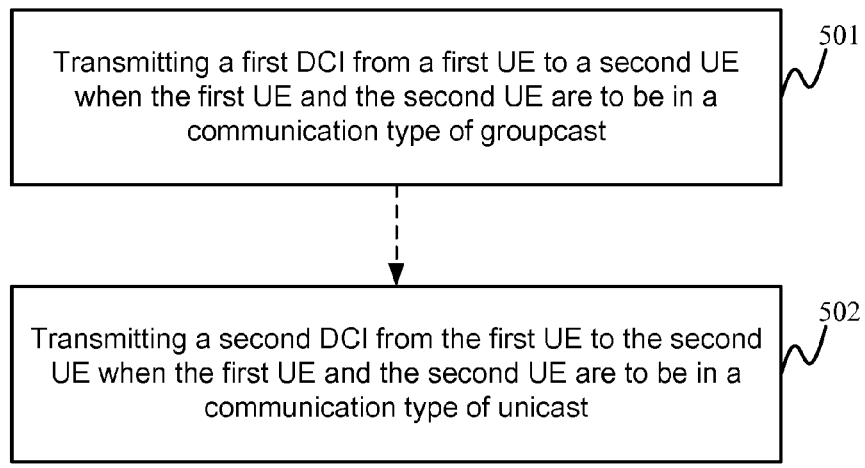
FIG. 5 illustrates a flowchart of a wireless communication method according to first embodiment of the present disclosure.

In the first embodiment of the present disclosure, there is provided a wireless communication method in which UEs can flexibly communicate through either unicast or groupcast, and fast transit between uinicast and groupcast. In particular, FIG. 5 illustrates a flowchart of the wireless communication method 500 according to first embodiment of the present disclosure. The communication method 500 comprises a step 501 of transmitting a first downlink control information (DCI) from a first UE (master UE) to a second UE (slave UE) when the first UE and the second UE are to be in a communication type of groupcast, wherein the first DCI is able to indicate the communication type of groupcast and a group ID of a UE group for the groupcast, and a first potential physical downlink shared channel (PDSCH) following the first DCI is scrambled by the group ID, and also comprises a step 502 of transmitting a second DCI from the first UE to the second UE when the first UE and the second UE are to be in a communication type of unicast, wherein the second DCI is able to indicate the communication type of unicast, and a second potential PDSCH following the second DCI is scrambled by a UE ID of the second UE. Wherein, the first DCI and the second DCI are scrambled by the UE ID of the second UE respectively if the first UE and the second UE are in the communication type of unicast upon transmitting the first DCI and the second DCI, and the first DCI and the second DCI are scrambled by the group ID respectively if the first UE and the second UE are in the communication type of groupcast upon transmitting the first DCI and the second DCI. It is noted that step 501 and step 502 are selectively performed according to the defined conditions.

In the above communication method, two DCIs are defined, of which the first DCI is used for groupcast, and the second DCI is used for unicast. When one UE (first UE or master UE) is going to communicate with other UEs (second UE or slave UE) in a manner of groupcast, i.e. when the first UE and the second UE are to be in a communication type of groupcast, the master UE transmits the first DCI (groupcast DCI) to the slave UE(s). The groupcast DCI is able to indicate the communication type of groupcast and a group ID of a UE group for the groupcast (the indication manner will be described later). When a slave UE receives the groupcast DCI, the slave UE recognizes that the DCI is a groupcast DCI through the indication of the communication type, and also obtains the group ID for decoding the potential PDSCH following the groupcast DCI. The potential PDSCH is a PDSCH (if any) carrying data for the UEs in the UE group whose group ID is the group ID. In this manner, the first UE and the second UE can transit or continue to be in the groupcast communication and the first UE can broadcast data to a UE group comprising the second UE after the groupcast DCI is received.

When the first UE transmits the first DCI, the first UE and the second UE can be in two different communication states, i.e. the unicast state or the groupcast state. If the first UE and the second UE are in the unicast state (i.e. the communication type of unicast) when the first UE transmits the first DCI, the first DCI is scrambled by the UE ID of the second UE in order for the second UE to decode the first DCI with the UE ID which is known to the second UE. When the second UE receives the first DCI and decodes it with its UE ID, the second UE recognizes that the first UE are to communicate with it through broadcast, and obtains the group ID. Then, the second UE can use the group ID to decode the potential PDSCH scrambled by the group ID. After the second UE recognizes the communication type and obtains the group ID, the first UE and the second UE become in the groupcast state (i.e. the communication type of groupcast), and the first UE can use the group ID to scramble the DCI and transmit it next time. In contrast, if the first UE and the second UE are in the groupcast state (i.e. the communication type of groupcast) when the first UE transmits the first DCI, the first DCI is scrambled by the group ID of the UE group for the groupcast in order for the second UE to decode the first DCI with the group ID which is known to the second UE (the group ID have been transmitted to the second UE through a previous groupcast DCI). It is noted that the first UE and the second UE being in the unicast state includes any circumstance in which the second UE has not formed a groupcast UE group with the first UE. For example, when the first UE and the second UE initiate communication for the first time or after the first UE is released from the groupcast UE group for example by a second DCI which will be described later, the first UE and the second UE are in the unicast state (i.e. the communication type of unicast). Accordingly, when the second UE has formed a groupcast UE group with the first UE for example by the first DCI, the first UE and the second UE are in the groupcast state (i.e. the communication type of groupcast).

In addition, that the first UE and the second UE are to be in a communication type of groupcast means that the first UE and the second UE will communicate through groupcast after the first DCI is received regardless of whether the first UE and the second UE are in the unicast state or the broadcast state when the first UE transmits this first DCI, for example, the second UE will decode a following possible PDSCH with the group ID instead of its UE ID, and the first UE will use the group ID to scramble the next possible DCI to the second UE. If the first UE and the second UE are in unicast state when the first UE transmits the first DCI, the communication type transits to the type of groupcast, and the possible PDSCH corresponding to this first DCI is scrambled by the group ID. If the first UE and the second UE are in groupcast state when the first UE transmits the first DCI, the communication type continues to be the type of groupcast. It is noted that the indication of communication type can also be an indication of type switching instead of the indication of absolute type of unicast or groupcast. In other words, the communication type can indicate whether the communication type is changed.

On the other hand, when one UE (first UE) is going to communicate with another UE (second UE) in a manner of unicast, i.e. when the first UE and the second UE are to be in a communication type of unicast, the first UE transmits the second DCI (unicast DCI) to the second UE. The unicast DCI is able to indicate the communication type of unicast (the indication manner will be described later). When the second UE receives the unicast DCI, the second UE recognizes that the DCI is a unicast DCI through the indication of the communication type, and the second UE will use its UE ID to decode a potential PDSCH following the unicast DCI. The potential PDSCH is a PDSCH (if any) carrying data for the second UE. In this manner, the first UE and the second UE can transit or continue to be in the unicast communication.

Similar to the first DCI, when the first UE transmits the second DCI, the first UE and the second UE can be in two different communication states, i.e. the unicast state or the groupcast state. If the first UE and the second UE are in the unicast state (i.e. the communication type of unicast) when the first UE transmits the second DCI, the second DCI is scrambled by the UE ID of the second UE in order for the second UE to decode the second DCI with the UE ID which is known to the second UE. When the second UE receives the second DCI and decodes it with its UE ID, the second UE recognizes that the first UE are to communicate with it through unicast. Then, the second UE can use its UE ID to decode the potential PDSCH scrambled by its UE ID. After the second UE recognizes the communication type, the first UE and the second UE continues to be in the unicast state (i.e. the communication type of unicast). In contrast, if the first UE and the second UE are in the groupcast state (i.e. the communication type of groupcast) when the first UE transmits the second DCI, the second DCI is scrambled by the group ID of the UE group for the groupcast in order for the second UE to decode the second DCI with the group ID which is known to the second UE. When the second UE receives the second DCI and decodes it with the group ID, the second UE recognizes that the first UE is going to communicate with it through unicast, and the communication type transits from the groupcast to the unicast. Similar to the first DCI, that the first UE and the second UE are to be in a communication type of unicast means that the first UE and the second UE will communicate through unicast after the second DCI is received regardless of whether the first UE and the second UE are in the unicast state or the broadcast state when the first UE transmits this second DCI, for example, the second UE will then decode the following possible PDSCH with it UE ID instead of the group ID, and the first UE will use the UE ID of the second UE to scramble the next possible DCI to the second UE. If the first UE and the second UE are in unicast state when the first UE transmits the first DCI, the communication type continues to be the type of unicast, and the possible PDSCH corresponding to this first DCI is scrambled by the UE ID of the second UE. If the first UE and the second UE are in groupcast state when the first UE transmits the first DCI, the communication type transits to the type of unicast.

In conclusion, in the first embodiment of the present disclosure, the UEs can flexibly communicate through unicast or groupcast, and fast transit between unicast and groupcast. When the UEs hope to transit from unicast to groupcast or continue to be in the groupcast state, a first DCI (groupcast DCI) can be transmitted. When the UEs hope to transit from groupcast to unicast or continue to be in the unicast state, a second DCI (unicast DCI) can be transmitted.

Figure 6:
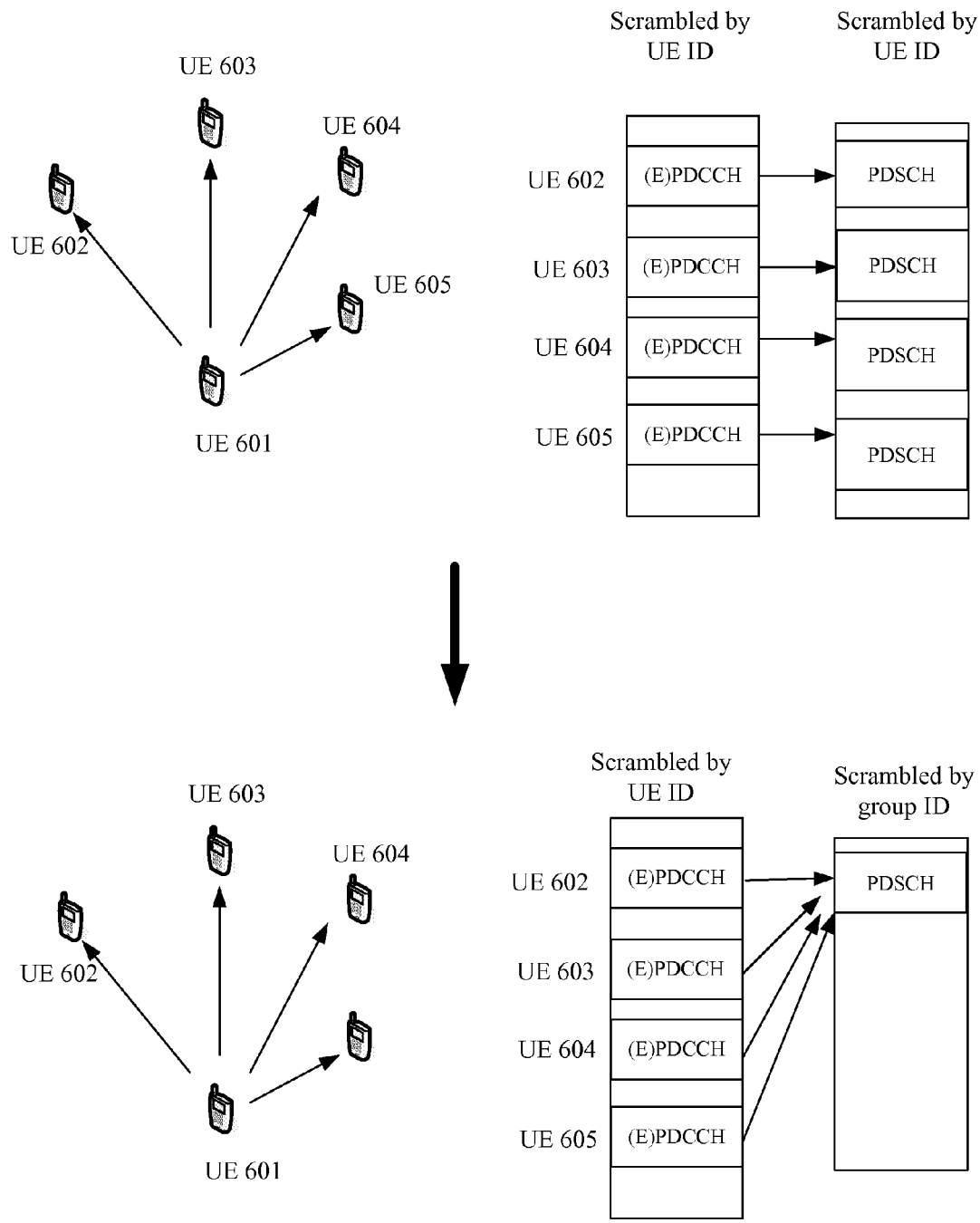
FIG. 6 illustrates an example of transition from unicast to groupcast according to the first embodiment of the present disclosure.

FIG. 6 illustrates an example of transition from unicast to groupcast according to the first embodiment of the present disclosure. On the upside of FIG. 6, UE 601 is communicating with UEs 602-605 through unicast respectively. In this circumstance, UE 601 can transmit a unicast DCI in (E)PDCCH ((enhanced) physical downlink control channel) and a PDSCH respectively to each of UEs 602-605, and both the unicast DCI and the PDSCH are scrambled by the respective UE ID. When UE 601 hopes to transit the communication type from unicast to groupcast, UE 601 (master UE) can transmit a groupcast DCI which is scrambled by the respective UE ID to each UE which is going to be included in the groupcast UE group (UEs 602-605 in this example), and transmit a common PDSCH which is scrambled by the group ID of the groupcast UE group, as shown on the downside of FIG. 6. Then, all the UEs (UEs 602-605) in the groupcast UE group can obtain the data in the common PDSCH by decoding it with the group ID.

After the transition, if the UEs in the groupcast UE group will continue to communicate through broadcast, the master UE 601 can then transmit one common groupcast DCI which is scrambled by the group ID to all the UEs 602-605 next time (not shown), and the UEs 602-605 can decode the common groupcast DCI by the group ID which has been transmitted through the groupcast DCI during the transition process shown on the downside of FIG. 6.

In addition, according to the first embodiment, if the communication type is groupcast when the master UE transmits a groupcast DCI (current groupcast DCI), the slave UE can use a group ID indicated by a previous groupcast DCI to decode the current groupcast DCI, and can further check whether the group ID used for the decoding is the same as the group ID indicated by the current groupcast DCI. If the two group IDs are not the same, it can be inferred that errors occur or the following PDSCH is scrambled by another group ID and not for the slave UE in question. Such a behaviour is like a virtual CRC (Cyclic Redundancy Check), which could increase the robustness of the groupcast communication.

In a first example of the first embodiment, preferably, the first DCI can be the same as the second DCI except that the bits in the first DCI which are corresponding to the bits which are not useful for the communication type of groupcast in the second DCI are used to indicate the group ID and/or the communication type. For example, the second DCI (unicast DCI) can use an existing DCI format such as defined in 3GPP Release 8-11 except that one bit in the DCI format may need to be used to indicate the communication type, and the first DCI (groupcast DCI) also use the same DCI format as the second DCI except that some bits (or fields) which may not be useful for the communication type of groupcast in the DCI format are re-used to indicate the group ID and/or the communication type.

In the groupcast communication, it is difficult to peform HARQ (Hybrid Automatic Repeat Request), CSI (Channel State Information) feedback, SRS (Sounding Reference Singal) transmission for slave UEs because it will cause too much feedback overhead to the master UE, especially when the number of slave UEs is large in the same groupcast UE group. It is impossible for group communication to do fine scheduling/link adaptation/power control based on CSI information of all slave UEs. Therefore, at least the following bits or filed in the existing DCI format can be re-used:

Carrier indicator—0~3 bits (for example, 1 bit can be used for indicating the communication type for both unicast and groupcast communication);
HARQ process number—3 bits;
Redundancy version—2 bits;
New data indicator—1 bit;
TPC command for PUCCH—2 bits;
SRS request—0~1 bit;
Modulation and coding scheme (MCS)—5 bits (fixed MCS is assumed for group communication).

Among those, HARQ related bits have highest priority to be re-used since HARQ is not used for groupcast communication, and CSI, SRS and MCS bits have second priority to be re-used. In addition, carrier aggregation is not an interest in D2D communication, so CIF (Carrier Indicator Field) could be reused as well. For example, when 1 bit of CIF is "0", it indicates unicast, and when such a bit is "1", it indicates groupcast. Moreover, In TM10 or other TM modes, PMI (Precoding Matrix Indication) index or PQI (PDSCH RE Mapping and Quasi-Co-Location Indicator) could be used to indicate the communication type. For example, PMI index 0 means unicast and PMI index 1 means groupcast.

Further, the communication type can be implicitly indicated by the physical resource block (PRB) index or the control channel element (CCE) index of the groupcast DCI (first DCI) or the unicast DCI (second DCI). For example, if the PRB index is odd, it means unicast communication, and if the PRB index is even, it means groupcast communication. Alternatively, the communication type can be implicitly indicated by the PRB index of the potential PDSCH for the second UE or the PRB index difference between the potential PDSCH and the DCI (EPDCCH).

In the above first example of the first embodiment, since the first DCI and the second DCI use the same existing DCI format, the effort for designing new DCIs can be saved and the blind detection times can also be reduced.

In a second example of the first embodiment, a new DCI is designed for the groupcast communication, and the new groupcast DCI can indicate the communication type and the group ID, and have a flexible length by padding bits to match the DCI used for the unicast (unicast DCI, which can use existing DCI format as described in the first example). In other words, the first DCI (a newly designed groupcast DCI) includes a bit for indicating the communication type and a plurality of bits for indicating the group ID, and is padded with additional bits to have the same length with the second DCI. In this second example, since the length of the first DCI and the second DCI is the same, the blind detection times are not increased.

In addition, for the first embodiment, in order to save space in the DCI, the group ID can be indicated in such a way that the bits for indicating the group ID in the first DCI indicates a group ID index by which the group ID can be selected from a group ID set configured by the radio resource control (RRC) layer. In other words, a group ID set comprising a plurality of group IDs is configured through RRC layer, and then the DCI in the physical layer can only need to indicate a group ID index to the slave UE. The slave UE can select a group ID corresponding to the group ID index. For example, if the number of group IDs in the set is 16, then only 4 bits are needed to indicate the group ID index. However, usually a group ID may need 16 bits, and thus 12 bits are saved for the DCI.

Moreover, as an alternative or modification to the first embodiment of the present disclosure, the communication type (or type switching information) can be indicated by higher layer (RRC/MAC) rather than the DCI.

Figure 7:
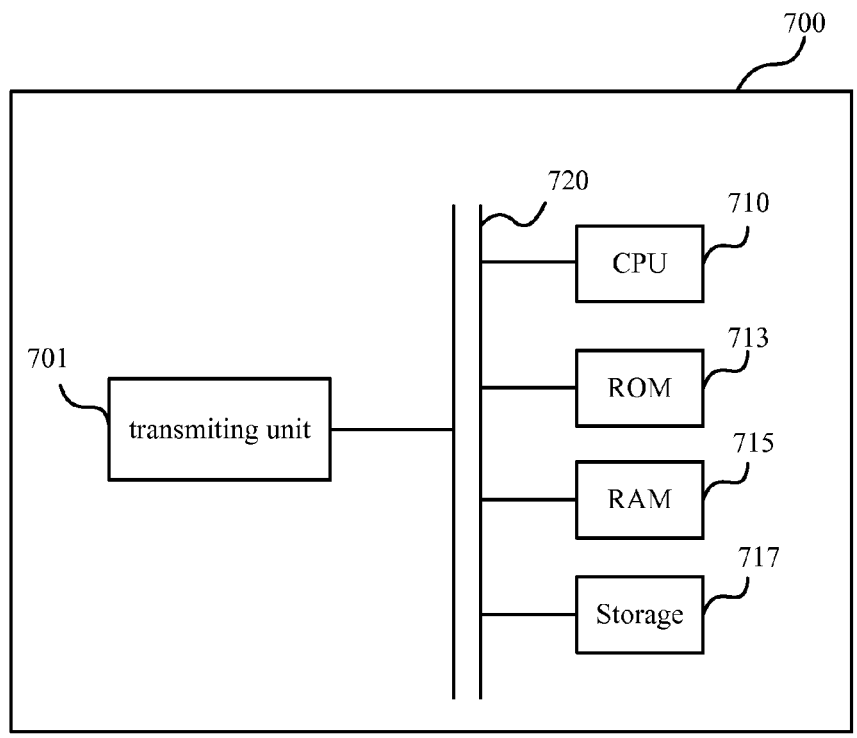
FIG. 7 is a block diagram illustrating a UE according to the first embodiment of the present disclosure.

In the first embodiment, an UE for performing the above method is provided. FIG. 7 is a block diagram illustrating a UE 700 according to the first embodiment of the present disclosure. UE 700 comprises a transmitting unit 701. The transmitting unit 701 can be configured to transmit a first DCI to a second UE when the UE 700 and the second UE are to be in a communication type of groupcast, wherein the first DCI is able to indicate the communication type of groupcast and a group ID of a UE group for the groupcast, and a first PDSCH following the first DCI is scrambled by the group ID, and the transmitting unit 701 can also be configured to transmit a second DCI to the second UE when the UE 700 and the second UE are to be in a communication type of unicast, wherein the second DCI is able to indicate the communication type of unicast, and a second potential PDSCH following the second DCI is scrambled by a UE ID of the second UE. Wherein the first DCI and the second DCI are scrambled by the UE ID of the second UE respectively if the UE and the second UE are in the communication type of unicast upon transmitting the first DCI and the second DCI, and the first DCI and the second DCI are scrambled by the group ID respectively if the UE and the second UE are in the communication type of groupcast upon transmitting the first DCI and the second DCI.

The UE 700 according to the present disclosure may optionally include a CPU (Central Processing Unit) 710 for executing related programs to process various data and control operations of respective units in the UE 700, a ROM (Read Only Memory) 713 for storing various programs required for performing various process and control by the CPU 710, a RAM (Random Access Memory) 715 for storing intermediate data temporarily produced in the procedure of process and control by the CPU 710, and/or a storage unit 717 for storing various programs, data and so on. The above transmitting unit 701, CPU 710, ROM 713, RAM 715 and/or storage unit 717 etc. may be interconnected via data and/or command bus 720 and transfer signals between one another.

Respective units as described above do not limit the scope of the present disclosure. According to one implementation of the disclosure, the functions of the above transmitting unit 701 may be implemented by hardware, and the above CPU 710, ROM 713, RAM 715 and/or storage unit 717 may not be necessary. Alternatively, the functions of the above transmitting unit 701 may also be implemented by functional software in combination with the above CPU 710, ROM 713, RAM 715 and/or storage unit 717 etc.

Figure 8:
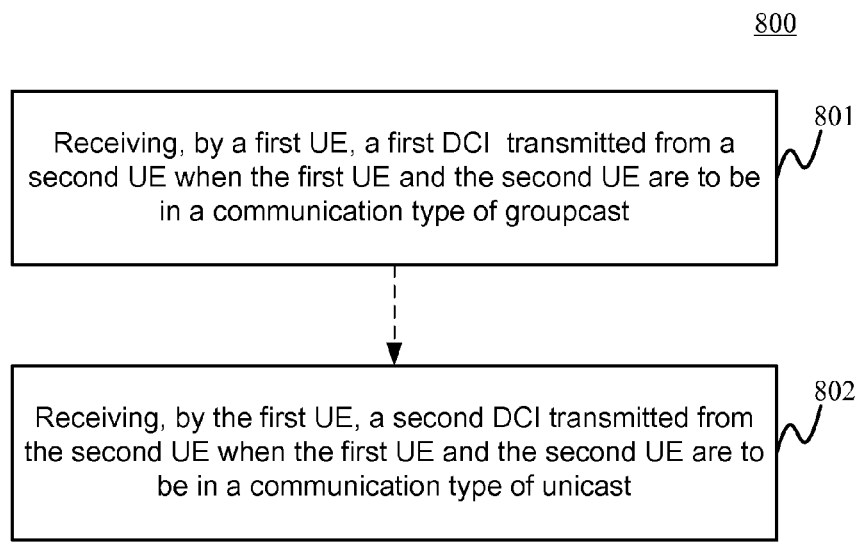
FIG. 8 illustrates a flowchart of another wireless communication method according to first embodiment of the present disclosure.

Accordingly, at receiving side, the first embodiment can be implemented as wireless communication method 800 as shown in FIG. 8. In particular, the method 800 comprises a step 801 of receiving, by a first UE (slave UE), a first downlink control information (DCI) transmitted from a second UE (master UE) when the first UE and the second UE are to be in a communication type of groupcast, wherein the first DCI is able to indicate the communication type of groupcast and a group ID of a UE group for the groupcast, and a first potential physical downlink shared channel (PDSCH) following the first DCI is scrambled by the group ID; and also comprises a step 802 of receiving, by the first UE, a second DCI transmitted from the second UE when the first UE and the second UE are to be in a communication type of unicast, wherein the second DCI is able to indicate the communication type of unicast, and a second potential PDSCH following the second DCI is scrambled by a UE ID of the first UE. Wherein the first DCI and the second DCI are scrambled by the UE ID of the first UE respectively if the first UE and the second UE are in the communication type of unicast upon transmitting the first DCI and the second DCI, and the first DCI and the second DCI are scrambled by the group ID respectively if the first UE and the second UE are in the communication type of groupcast upon transmitting the first DCI and the second DCI. It is noted that the meaning of "first UE" and "second UE" for the receiving side is opposite to that at the transmitting side, i.e. the first UE from the receiving side can be a slave UE, and the second UE from the receiving side can be a master UE.

Figure 9:
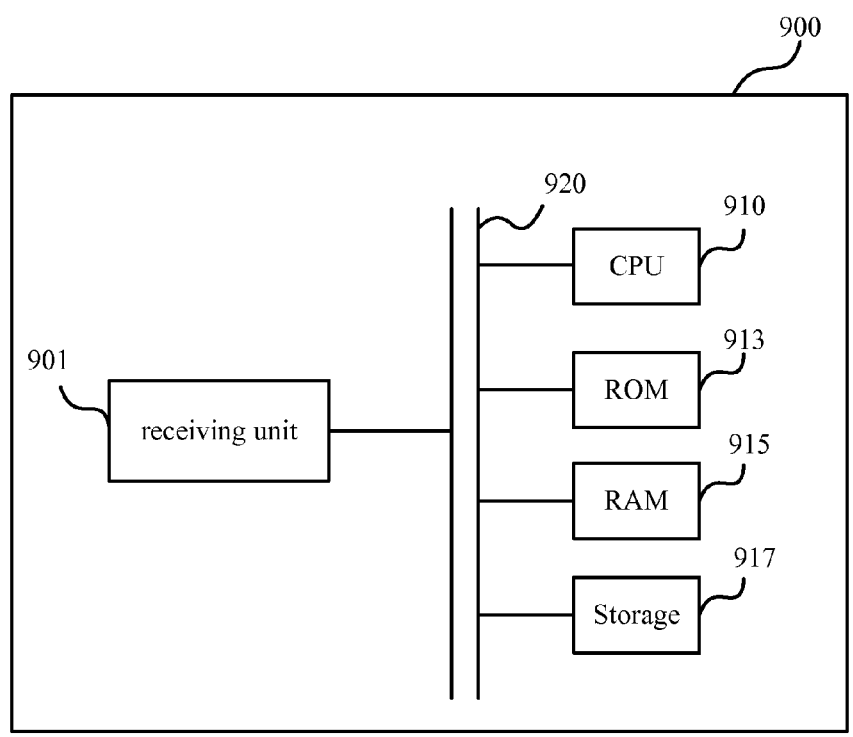
FIG. 9 is a block diagram illustrating another UE according to the first embodiment of the present disclosure.

In addition, a UE at the receiving side is also provided according to the first embodiment. FIG. 9 is a block diagram illustrating a UE 900 according to the first embodiment of the present disclosure. UE 900 comprises a receiving unit 901. The receiving unit 901 can be configured to receive a first downlink control information (DCI) transmitted from a second UE when the UE 900 and the second UE are to be in a communication type of groupcast, wherein the first DCI is able to indicate the communication type of groupcast and a group ID of a UE group for the groupcast, and a first potential physical downlink shared channel (PDSCH) following the first DCI is scrambled by the group ID. The receiving unit 901 can also be configured to receive a second DCI transmitted from the second UE when the UE 900 and the second UE are to be in a communication type of unicast, wherein the second DCI is able to indicate the communication type of unicast, and a second potential PDSCH following the second DCI is scrambled by a UE ID of the UE. Wherein the first DCI and the second DCI are scrambled by the UE ID of the UE respectively if the UE and the second UE are in the communication type of unicast upon transmitting the first DCI and the second DCI, and the first DCI and the second DCI are scrambled by the group ID respectively if the UE and the second UE are in the communication type of groupcast upon transmitting the first DCI and the second DCI.

The UE 900 according to the present disclosure may optionally include a CPU (Central Processing Unit) 910 for executing related programs to process various data and control operations of respective units in the UE 900, a ROM (Read Only Memory) 913 for storing various programs required for performing various process and control by the CPU 910, a RAM (Random Access Memory) 915 for storing intermediate data temporarily produced in the procedure of process and control by the CPU 910, and/or a storage unit 717 for storing various programs, data and so on. The above receiving unit 901, CPU 910, ROM 913, RAM 915 and/or storage unit 917 etc. may be interconnected via data and/or command bus 920 and transfer signals between one another.

Respective units as described above do not limit the scope of the present disclosure. According to one implementation of the disclosure, the functions of the above receiving unit 901 may be implemented by hardware, and the above CPU 910, ROM 913, RAM 915 and/or storage unit 917 may not be necessary. Alternatively, the functions of the above receiving unit 901 may also be implemented by functional software in combination with the above CPU 910, ROM 913, RAM 915 and/or storage unit 917 etc.

(Second Embodiment)

Figure 10:
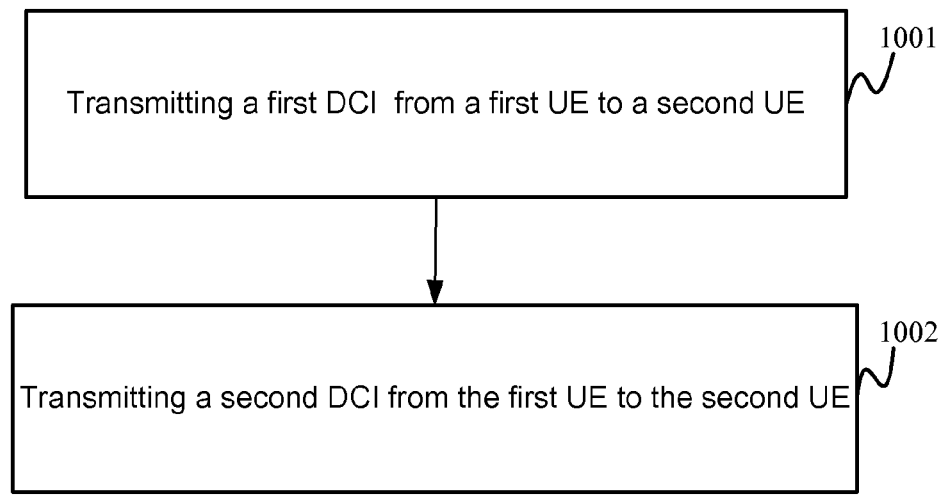
FIG. 10 illustrates a flowchart of a wireless communication method according to a second embodiment of the present disclosure.

In order to realize fast and flexible transition between groupcast and unicast for D2D communication, according to the second embodiment, two DCIs can be transmitted from the master UE simultaneously, and the slave UEs will decode both the DCI in order to judge which communication type (groupcast or unicast) are to be used. In particular, FIG. 10 illustrates a flowchart of the wireless communication method 1000 according to a second embodiment of the present disclosure. The method 1000 comprises a step 1001 of transmitting a first downlink control information (DCI) from a first UE (master UE) to a second UE (slave UE), and a step 1002 of transmitting a second DCI from the first UE to the second UE. In the method 1000, whether a specific field in the first DCI and the second DCI is the same indicates whether the first UE and the second UE are to be in a communication type of unicast or groupcast, and when the first UE and the second UE are to be in the communication type of groupcast, at least one of the first DCI and the second DCI indicates a group ID of a UE group for the groupcast. In addition, the first DCI and the second DCI are scrambled by a UE ID of the second UE if the first UE and the second UE are in the communication type of unicast upon transmitting the first DCI and the second DCI, and the first DCI and the second DCI are scrambled by the group ID if the first UE and the second UE are in the communication type of groupcast upon transmitting the first DCI and the second DCI.

According to the second embodiment, two DCIs are transmitted by the first UE one time, the second UE receives and decodes both the DCIs by blind detection, and checks a specific field (for example, the resource allocation field) in both the DCIs. The second UE can determine whether the first UE and the second UE are to be in a communication type of unicast or groupcast based on whether the specific field in the first DCI and the second DCI is the same. For example, if the specific field is the same, the unicast is indicated, and if the specific field is different, the groupcast is indicated, vice versa. When it is indicated that the first UE and the second UE are to be in the communication type of groupcast, at least one of the first DCI and the second DCI indicates a group ID of a UE group for the groupcast. The group ID is used for the second UE to decode the following possible PDSCH which is scrambled by the group ID. In addition, similar to the first embodiment, the first DCI and the second DCI are scrambled by a UE ID of the second UE if the first UE and the second UE are in the communication type of unicast upon transmitting the first DCI and the second DCI, and the first DCI and the second DCI are scrambled by the group ID if the first UE and the second UE are in the communication type of groupcast upon transmitting the first DCI and the second DCI.

As an example to the second embodiment, the first DCI uses an existing DCI format, and the second DCI is a newly designed DCI which comprises the indication of the group ID. When the resource allocation (the specific field) of the second DCI is the same as that of the first DCI, the first UE and the second UE are to communicate through unicast. When the resource allocation (the specific field) of the second DCI is different from that of the first DCI, the first UE and the second UE are to communicate through groupcast, the resource allocation follows the second DCI, and the second UE can use the group ID indicated in the second DCI to decode a potential PDSCH.

Further, similar to the first embodiment, in order to save space in the DCI, the group ID can be indicated in such a way that the bits for indicating the group ID in the first and/or second DCI indicates a group ID index by which the group ID can be selected from a group ID set configured by the radio resource control (RRC) layer.

In the second embodiment, an UE at the transmitting side for performing the above method is also provided. The UE at the transmitting side according to the second embodiment comprising a transmitting unit has a similar configuration as UE 700 according to the first embodiment except the following. The transmitting unit is configured to transmit a first DCI and a second DCI to the second UE, wherein whether a specific field in the first DCI and the second DCI is the same indicates whether the UE and the second UE are to be in a communication type of unicast or groupcast, when the UE and the second UE are to be in the communication type of groupcast, at least one of the first DCI and the second DCI indicates a group ID of a UE group for the groupcast, and the first DCI and the second DCI are scrambled by a UE ID of the second UE if the UE and the second UE are in the communication type of unicast upon transmitting the first DCI and the second DCI, and the first DCI and the second DCI are scrambled by the group ID if the UE and the second UE are in the communication type of groupcast upon transmitting the first DCI and the second DCI.

Figure 11:
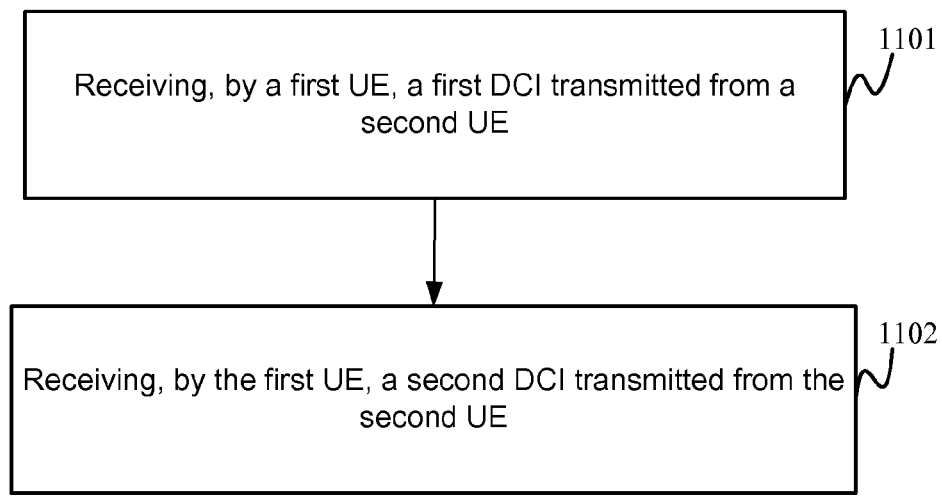
FIG. 11 illustrates a flowchart of another wireless communication method according to a second embodiment of the present disclosure.

Accordingly, at receiving side, the second embodiment can be implemented as a wireless communication method 1100 as shown in FIG. 11. In particular, the method 1100 comprises a step 1101 of receiving, by a first UE (slave UE), a first downlink control information (DCI) transmitted from a second UE (master UE); and receiving, by the first UE, a second DCI transmitted from the second UE, wherein whether a specific field in the first DCI and the second DCI is the same indicates whether the first UE and the second UE are to be in a communication type of unicast or groupcast, when the first UE and the second UE are to be in the communication type of groupcast, at least one of the first DCI and the second DCI indicates a group ID of a UE group for the groupcast, and the first DCI and the second DCI are scrambled by a UE ID of the first UE if the first UE and the second UE are in the communication type of unicast upon transmitting the first DCI and the second DCI, and the first DCI and the second DCI are scrambled by the group ID if the first UE and the second UE are in the communication type of groupcast upon transmitting the first DCI and the second DCI. It is noted that the meaning of "first UE" and "second UE" for the receiving side is opposite to that at the transmitting side, i.e. the first UE from the receiving side is a slave UE, and the second UE from the receiving side is a master UE.

Further, an UE at the receiving side for performing the above method is also provided according to the second embodiment. The UE at the receiving side according to the second embodiment comprising a receiving unit has a similar configuration as UE 900 according to the first embodiment except the following. The receiving unit is configured to receive a first downlink control information (DCI) and a second DCI transmitted from a second UE, wherein whether a specific field in the first DCI and the second DCI is the same indicates whether the UE and the second UE are to be in a communication type of unicast or groupcast, when the UE and the second UE are to be in the communication type of groupcast, at least one of the first DCI and the second DCI indicates a group ID of a UE group for the groupcast, and the first DCI and the second DCI are scrambled by a UE ID of the UE if the UE and the second UE are in the communication type of unicast upon transmitting the first DCI and the second DCI, and the first DCI and the second DCI are scrambled by the group ID if the UE and the second UE are in the communication type of groupcast upon transmitting the first DCI and the second DCI.

(Third Embodiment)

Another important problem for D2D communication is how to do resource allocation in groupcast communication. Fine resource allocation like unicast is one approach but it may need many designs, e.g., CSI feedback, HARQ, power control, and link adaptation. Therefore, big standardization efforts are needed. In addition, it may not be reasonable to consider HARQ for all slave users as the feedback overhead is big. Essential or minimum functions should be designed first to guarantee basic communication. Another solution to solve the resource allocation is to do coarse resource allocation for D2D groupcast communication, that is, no HARQ, fixed MCS and potential power control, and fixed resource position. SPS (Semi-Persistent Scheduling) is supported in current release and it is a kind of semi-static resource allocation method. However, SPS only supports periodic resource allocation, which is potentially not flexible and efficient for D2D. In addition, SPS is for unicast communication not for groupcast communication. Another approach is that coarse resource allocation is configured by high-layer signaling (RRC/MAC); however, such an approach is slow and cannot be adjusted in time as RRC signaling interaction will generally need hundreds of microseconds.

Figure 12:
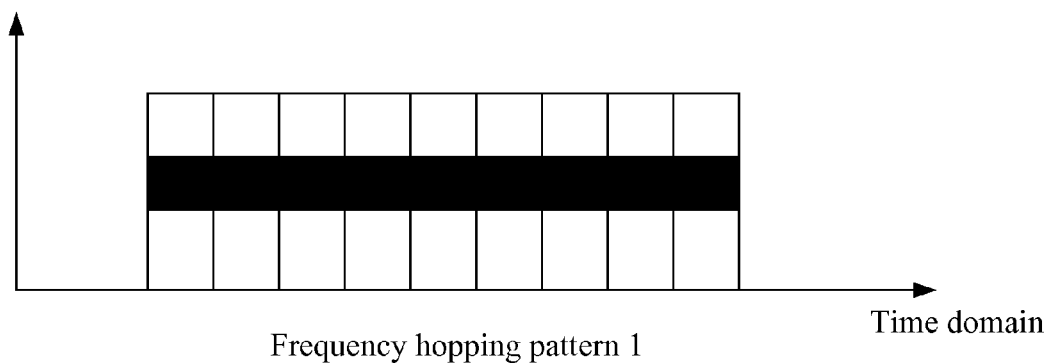
FIG. 12 illustrates a flowchart of a wireless communication method according to a third embodiment of the present disclosure.

According to the third embodiment of the present disclosure, there is provided a wireless communication method 1200 for resource allocation as shown in FIG. 12. The method 1200 comprises a step 1201 of transmitting a downlink control information (DCI) for the resource allocation from a first user equipment (UE) to a second UE, wherein the DCI is able to indicate a resource allocation pattern and a transmission life.

Figure 13:
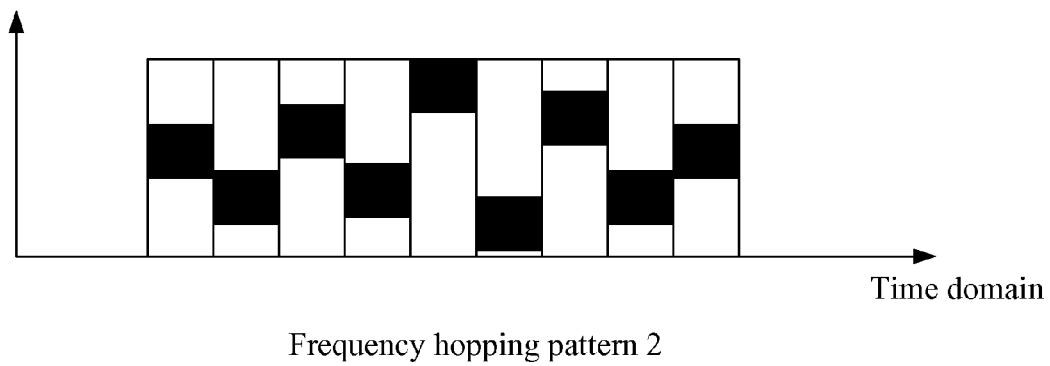
FIG. 13 illustrates two exemplary frequency hopping patterns.
Figures 14, 15:
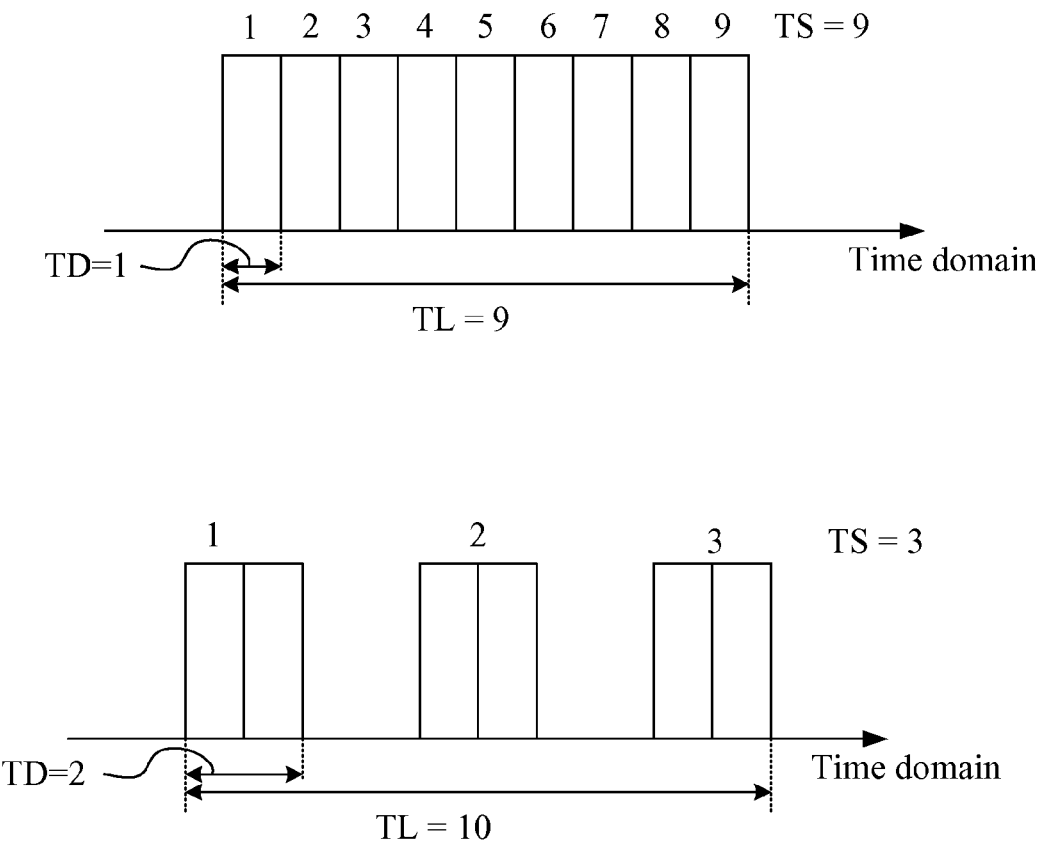
FIG. 14 illustrates two examples of resource allocation pattern.
FIG. 15 illustrates a flowchart of another wireless communication method according to a third embodiment of the present disclosure.

In the third embodiment, the DCI implicitly or explicitly indicate a resource allocation pattern and a transmission life for the resource allocation of D2D communication, especially for the groupcast communication. The transmission life herein means how long the resource allocation would last, and it can be in the unit of TTI (Transmission Time Interval). The resource allocation pattern herein refers to any information on how to allocate pattern within the transmission life. For example, the resource allocation pattern can include frequency hopping pattern, transmission times, and/or transmission duration. FIG. 13 illustrates two exemplary frequency hopping patterns. In frequency hopping pattern 1, the same frequency resource is allocated, while in frequency hopping pattern 2, different frequency resources are allocated for different time slots, i.e. the frequency hopping is realized. The transmission times mean how many times the transmission will be performed within the transmission life, and the transmission duration means how long one transmission will last. FIG. 14 illustrates two examples of resource allocation pattern. In the upside example, the transmission life (TL) is 9 TTIs, the transmission times (TS) is 9, and the transmission duration (TD) is 1 TTI; therefore, the resulting resource allocation is a continuous resource allocation for 9 TTIs. In the downside example, the transmission life is 10 TTIs, the transmission times are 3, and the transmission duration is 2 TTIs; then the shown resource allocation is resulted by assuming the transmissions are allocated evenly in the time domain. It is noted that FIG. 14 is only an example of the third embodiment, and the resource allocation pattern can be any suitable pattern. In addition, the above parameters used to define the allocation pattern are also only examples, which can be replaced by other suitable parameters, for example, the transmission times can be replaced by transmission interval which represents the time distance between two transmissions. In the upside example of FIG. 14, the transmission interval is 0

TTI, while in the downside example, the transmission interval is 2 TTIs. Moreover, the frequency hopping pattern can be combined with the time domain pattern.

As an alternative or modification to the third embodiment, the resource allocation pattern and/or the transmission life can also be signaled by higher layer (RRC/MAC) or specified in the specification.

In the third embodiment, the resource allocation pattern can be indicated in such a way that the information for (implicitly or explicitly) indicating the resource allocation pattern in the DCI indicates a resource allocation pattern index by which the resource allocation pattern can be selected from a resource allocation pattern set configured by the radio resource control (RRC) layer. In other words, a resource allocation pattern set comprising a plurality of resource allocation patterns is configured by RRC layer, and DCI only needs to indicate which resource allocation pattern is selected in the set. In this manner, bits for indicating the resource allocation pattern can be reduced.

In the third embodiment, in order to reduce the required bits in DCI as much as possible, preferably the resource allocation pattern and/or the transmission life can be implicitly indicated by the physical resource block (PRB) index and/or number of the DCI, and/or the control channel element (CCE) index and/or number of the DCI ((E)PDCCH). For example, the starting CCE index=16 could mean that the transmission times or transmission life is 16 TTIs or the resource allocation pattern uses the resource allocation pattern with index "16" in the set configured by RRC. Alternatively, the aggregation level (corresponding to a certain CCE number)=8 could mean transmission times or transmission life is 8 TTIs or the resource allocation pattern uses the resource allocation pattern with index "8" in the set configured by RRC. In addition, combination of the PRB and CCE indications is also possible. In this example, hopping pattern could be configured by high layer (RRC/MAC).

Alternatively, the resource allocation pattern and/or the transmission life can also be implicitly indicated by the PRB index and/or number of the PDSCH allocated to the second UE. Similar to the above (E)PDCCH indication, for example, the starting PRB index=16 could mean that the transmission times or transmission life is 16 TTIs or the resource allocation pattern uses the resource allocation pattern with index "16" in the set configured by RRC.

Alternatively, the resource allocation pattern and/or the transmission life can also be implicitly indicated by the PRB index and/or number difference between the PDSCH allocated to the second UE and the DCI ((E)PDCCH). Similar to the above (E)PDCCH indication, for example, the PRB index difference between the PDSCH and the EPDCCH=16 could mean that the transmission times or transmission life is 16 TTIs or the resource allocation pattern uses the resource allocation pattern with index "16" in the set configured by RRC.

In the third embodiment, preferably, the DCI can use any existing DCI format such as defined in 3GPP Release 8-11 except that some bits in the DCI format defined in 3GPP Release 8-11 are used to indicate the resource allocation pattern and/or the transmission life in the DCI. As described in the first embodiment, in D2D communication, especially in the groupcast communication, many bits or fields in the existing DCI format may not be useful, and thus can be re-used for the above resource allocation. For example, if compact DCI (e.g., DCI format 1C) is assumed, then at least the following bits could be re-used: Modulation and coding scheme—5 bits (assuming MCS is fixed or configured already by RRC in the above resource allocation). If normal DCI (e.g., DCI format 1A/2C/2D) is assumed, then many fields such as follows could be re-used since the assumption is no HARQ, no CSI/SRS requests: Modulation and coding scheme—5 bits; HARQ process number—3 bits (FDD), 4 bits (TDD); Redundancy version—2 bits. In addition, the DCI format type can also be used for indicating the type of resource allocation implicitly. Herein, the type of resource allocation means what type of resource allocation is used in the DCI, for example, a conventional periodical allocation mode, SPS periodical allocation mode, or the allocation mode defined in the third embodiment for D2D communication (referred to as D2D allocation mode). For example, DCI 2D may be used to implicitly indicate the allocation mode defined in the third embodiment or the SPS periodical allocation mode, and DCI 1A may be used to implicitly indicate a conventional continuous allocation mode.

Alternatively, the type of the resource allocation can also be indicated by several fields in the DCI jointly. For example, the difference between the SPS activation and the D2D allocation activation is shown in Table 1, wherein DCI 2X is assumed.

TABLE 1

Example of SPS activation and D2D allocation activation

| | | | | | | |
|---|---|---|---|---|---|---|
| SPS activation | TPC command for scheduled PUSCH = "NA" | Cyclic shift DM RS = NA | Modulation and coding scheme and redundancy version = NA | HARQ process number = "000" | Modulation and coding scheme MSB = 0 | Redundancy version = 0 |
| D2D allocation activation | same | same | same | HARQ process number = "111" | Modulation and coding scheme MSB = 1 | Redundancy version = 1 |

As shown in Table 1, if the fields listed in Table 1 are detected to have the values for the SPS activation, the DCI indicates a SPS mode, and the SPS is activated. If the fields listed in Table 1 are detected to have the values for the D2D allocation activation, the DCI indicates a D2D allocation mode, and the D2D allocation mode is activated.

Alternatively, the allocation type can also be differentiated by different radio network temporary identifiers (RNTIs). According to this solution, as shown in FIG. 15, there is provided a wireless communication method 1500 for resource allocation, comprising a step 1501 of transmitting either a first DCI for a first resource allocation type or a second DCI for a second resource allocation type from a first UE to a second UE, wherein the first DCI is scrambled by a first RNTI and the second DCI is scrambled by a second RNTI which is different from the first RNTI. According to the wireless communication method 1500, the allocation type can be distinguished by different RNTI. For example, the first DCI and the first RNTI is for the SPS mode, and the second DCI and the second RNTI is for the D2D allocation mode.

In the third embodiment, an UE at the transmitting side for performing the above method is also provided. The UE at the transmitting side according to the third embodiment comprising a transmitting unit has a similar configuration as UE 700 according to the first embodiment except the following. The transmitting unit is configured to transmit a downlink control information (DCI) for resource allocation from the UE to a second UE, wherein the DCI is able to indicate a resource allocation pattern and a transmission life.

In the third embodiment, another UE at the transmitting side for performing the above method is also provided. The UE at the transmitting side according to the third embodiment comprising a transmitting unit has a similar configuration as UE 700 according to the first embodiment except the following. The transmitting unit is configured to transmit either a first downlink control information (DCI) for a first resource allocation type or a second DCI for a second resource allocation type to a second UE, wherein the first DCI is scrambled by a first radio network temporary identifier (RNTI) and the second DCI is scrambled by a second RNTI which is different from the first RNTI.

Figure 16:
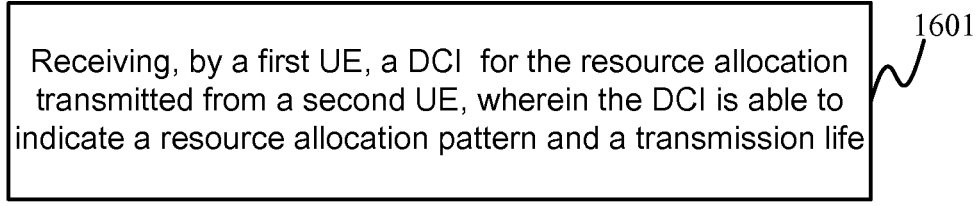
FIG. 16 illustrates a flowchart of another wireless communication method according to a third embodiment of the present disclosure.

Accordingly, at the receiving side, the third embodiment can be implemented as a wireless communication method 1600 as shown in FIG. 16. In particular, the method 1600 comprises a step 1601 of receiving, by a first UE, a downlink control information (DCI) for the resource allocation transmitted from a second UE, wherein the DCI is able to indicate a resource allocation pattern and a transmission life.

Figure 17:
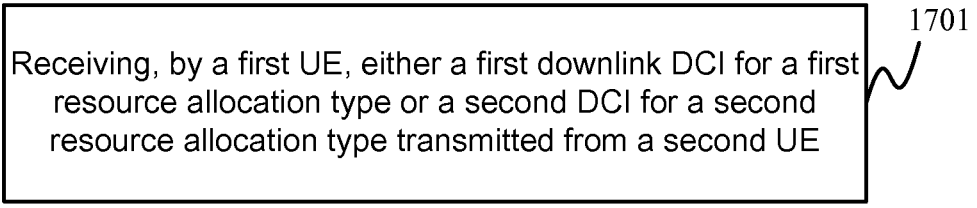
FIG. 17 illustrates a flowchart of another wireless communication method according to a third embodiment of the present disclosure.

In addition, at the receiving side, the third embodiment can also be implemented as a wireless communication method 1700 as shown in FIG. 17. In particular, the method 1700 comprises a step 1701 of receiving, by a first UE, either a first downlink control information (DCI) for a first resource allocation type or a second DCI for a second resource allocation type transmitted from a second UE, wherein the first DCI is scrambled by a first radio network temporary identifier (RNTI) and the second DCI is scrambled by a second RNTI which is different from the first RNTI. It is noted that the meaning of "first UE" and "second UE" for the receiving side is opposite to that at the transmitting side.

Further, an UE at the receiving side for performing the above method is also provided according to the third embodiment. The UE at the receiving side according to the second embodiment comprising a receiving unit has a similar configuration as UE 900 according to the first embodiment except the following. The receiving unit can be configured to receive a downlink control information (DCI) for the resource allocation transmitted from a second UE, wherein the DCI is able to indicate a resource allocation pattern and a transmission life.

Moreover, another UE at the receiving side for performing the above method is also provided according to the third embodiment. The UE at the receiving side according to the third embodiment comprising a receiving unit has a similar configuration as UE 900 according to the first embodiment except the following. The receiving unit can be configured to receive either a first downlink control information (DCI) for a first resource allocation type or a second DCI for a second resource allocation type transmitted from a second UE, wherein the first DCI is scrambled by a first radio network temporary identifier (RNTI) and the second DCI is scrambled by a second RNTI which is different from the first RNTI.

It is noted that the above embodiments can be combined to form a new embodiment; in particular, the third embodiment can be combined with the first or second embodiment to carry out both unicast-groupcast transition and resource allocation.

The present invention can be realized by software, hardware, or software in cooperation with hardware. Each functional block used in the description of each embodiment described above can be realized by an LSI as an integrated circuit. They may be individually formed as chips, or one chip may be formed so as to include a part or all of the functional blocks. The LSI here may be referred to as an IC, a system LSI, a super LSI, or an ultra LSI depending on a difference in the degree of integration. However, the technique of implementing an integrated circuit is not limited to the LSI and may be realized by using a dedicated circuit or a general-purpose processor. In addition, a FPGA (Field Programmable Gate Array) that can be programmed after the manufacture of the LSI or a reconfigurable processor in which the connections and the settings of circuits cells disposed inside the LSI can be reconfigured may be used. Further, the calculation of each functional block can be performed by using calculating means, for example, including a DSP or a CPU, and the processing step of each function may be recorded on a recording medium as a program for execution. Furthermore, when a technology for implementing an integrated circuit that substitutes the LSI appears in accordance with the advancement of the semiconductor technology or other derivative technologies, it is apparent that the functional block may be integrated by using such technologies.

It is noted that the present invention intends to be variously changed or modified by those skilled in the art based on the description presented in the specification and known technologies without departing from the content and the scope of the present invention, and such changes and applications fall within the scope that claimed to be protected. Furthermore, in a range not departing from the content of the invention, the constituent elements of the above-described embodiments may be arbitrarily combined.

What is claimed is:

1. A wireless communication method performed by a first user equipment (UE) in a device-to-device (D2D) communication, the method comprising:
    scrambling first control information by a second UE ID, the first control information including a group ID and resource allocation information;
    transmitting the first control information from the first UE to the second UE;
    after scrambling the first control information, scrambling second control information by the group ID, the second control information including resource allocation information; and
    transmitting the second control information from the first UE to the second UE,
    wherein the first and second control information includes bits used to indicate the resource allocation information including a frequency hopping pattern.

2. The wireless communication method according to claim 1, wherein
    the resource allocation information includes transmission life information whose unit is Transmission Time Interval (TTI).

3. The wireless communication method according to claim 1, wherein
the resource allocation information includes time resource information.

4. The wireless communication method according to claim 1, wherein
a groupcast communication type is implicitly indicated by a physical resource block (PRB) index or a control channel element (CCE) index of the first control information, or by the PRB index of a physical downlink shared channel (PDSCH), or by the PRB index difference between the PDSCH and the first control information.

5. A first user equipment (UE) for wireless communication, comprising:
circuitry, which, in operation, scrambles first control information by a second UE ID, the first control information including a group ID and resource allocation information; and
a transmitter, which, in operation, transmits the first control information from the first UE to the second UE,
wherein the circuitry, after scrambling the first control information, scrambles second control information by the group ID, the second control information including resource allocation information, and the transmitter transmits the second control information from the first UE to the second UE; and
wherein the first and second control information includes bits used to indicate the resource allocation information including a frequency hopping pattern.

6. The user equipment according to claim 5, wherein
the resource allocation information includes transmission life information whose unit is Transmission Time Interval (TTI).

7. The user equipment according to claim 5, wherein
the resource allocation information include time resource information.

8. An integrated circuit for controlling operation of a first user equipment (UE) in device-to-device (D2D) communication, comprising:
processing circuitry, which, in operation, scrambles first control information by a second UE ID, the first control information including a group ID and resource allocation information; and
transmission circuitry, which, in operation, controls transmission a the first control information from the first UE to the second UE,
wherein the processing circuitry, after scrambling the first control information, scrambles second control information by the group ID, the second control information including resource allocation information, and the transmission circuitry controls transmission of the second control information from the first UE to the second UE;
wherein the first and second control information includes bits used to indicate the resource allocation information including a frequency hopping pattern.

9. The integrated circuit according to claim 8, wherein
the resource allocation information includes transmission life information whose unit is Transmission Time Interval (TTI).

10. The integrated circuit according to claim 8, wherein
the resource allocation information include time resource information.

* * * * *